United States Patent
Brolin et al.

(10) Patent No.: US 7,352,781 B2
(45) Date of Patent: Apr. 1, 2008

(54) DUAL BACKPLANE RATE, TRIPLE OC3 SERVICE UNIT

(75) Inventors: Stephen J. Brolin, Livingston, NJ (US); David Michael Colven, Dallas, TX (US)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 10/703,542

(22) Filed: Nov. 10, 2003

(65) Prior Publication Data

US 2005/0100059 A1   May 12, 2005

(51) Int. Cl.
*H04J 3/04* (2006.01)
*H04J 3/02* (2006.01)

(52) U.S. Cl. ............. 370/532; 370/535; 370/539; 370/541

(58) Field of Classification Search ............. None
See application file for complete search history.

(56) References Cited

U.S. PATENT DOCUMENTS

| | | | | |
|---|---|---|---|---|
| 5,878,039 | A * | 3/1999 | Gorshe et al. | 370/376 |
| 6,275,510 | B1 * | 8/2001 | Koenig et al. | 370/535 |
| 6,356,550 | B1 * | 3/2002 | Williams | 370/364 |
| 6,529,303 | B1 * | 3/2003 | Rowan et al. | 398/82 |
| 6,760,327 | B1 * | 7/2004 | Manchester et al. | 370/364 |
| 7,009,963 | B1 * | 3/2006 | Schulz | 370/359 |
| 7,068,650 | B1 * | 6/2006 | Bachar et al. | 370/380 |
| 7,164,860 | B1 * | 1/2007 | Narvaez et al. | 398/58 |
| 2002/0163937 | A1 * | 11/2002 | Svacek et al. | 370/468 |
| 2003/0112831 | A1 * | 6/2003 | Williams | 370/535 |
| 2004/0240485 | A1 * | 12/2004 | Lipski et al. | 370/537 |

\* cited by examiner

*Primary Examiner*—Andrew C. Lee
(74) *Attorney, Agent, or Firm*—Bingham McCutchen LLP

(57) ABSTRACT

A system for intercommunicating data traffic provides the capability to connect external interfaces that use one third or less of the OC3 bandwidth capacity in a reduced bandwidth mode that reduces system cost, while automatically switching to the full bandwidth mode to allow connection to external interfaces that utilize the full OC3 bandwidth capacity. A system for intercommunicating data traffic comprises a backplane having a plurality of data traffic communications connections operable to communicate data traffic, the backplane having a plurality of data rates of operation and a Service Unit having a plurality of external data traffic communications interfaces and a data traffic communications interface to the data traffic communications connections of the backplane, the Service Unit operable to communicate data between the plurality of external data traffic communications interfaces and the data traffic communications interface, the Service Unit further including a multiplexer operable to multiplex data from the plurality of external data traffic communications interfaces to the data traffic communications interface in a plurality of modes of operation.

17 Claims, 5 Drawing Sheets

DUAL BACKPLANE RATE, TRIPLE OC3 SERVICE UNIT

FIELD OF THE INVENTION

The present invention relates to a bandwidth extender for a LAN Service Unit that increases LAN Service Unit backplane bandwidth.

BACKGROUND OF THE INVENTION

Synchronous optical network (SONET) is a standard for optical telecommunications that provides the transport infrastructure for worldwide telecommunications. SONET offers cost-effective transport both in the access area and core of the network. For instance, telephone or data switches rely on SONET transport for interconnection.

In many applications, one type of signal is interfaced to another type of signal. For example, an Asynchronous Transfer Mode signal may be interfaced with SONET signals. Other examples may include an STS1 signal that includes VT mapped DS1's, or an STS1 mapped DS3. (In some cases the DS3 could be carrying ATM, but in other cases it could carry DS1's, Ethernet, etc).

Typically, different types of signals may be interfaced by use of an interface device known as a Service Unit (SU). Using ATM as an example, the data traffic must be communicated in the SU between the ATM ports and the SONET ports of the SU. In many applications, the channel types and numbers of channels on the ATM ports do not correspond to the channel types and numbers of channels on the SONET ports in a way that provides an efficient and cost-effective utilization of the resources of conventional SUs. Typically, these resources include the design and bandwidth of the backplane that is used to interconnect the devices that interface with the ATM and SONET ports of the SU. Likewise, should the channel types and numbers of channels of either the ATM ports or the SONET ports change, conventional SUs may not be able to accommodate the changes in an efficient and cost-effective way. A need arises for a technique by which SU backplane resources can be configured to handle a variety of configurations of the channel types and numbers of channels of ATM ports and SONET ports, and changes to such configurations, in an efficient and cost-effective way.

SUMMARY OF THE INVENTION

The present invention provides the capability to connect external interfaces that use one third or less of the OC3 bandwidth capacity in a reduced bandwidth mode that reduces system cost, while automatically switching to the full bandwidth mode to allow connection to external interfaces that utilize the full OC3 bandwidth capacity. Thus, the present invention advantageously provides a combination of reduced cost, where applicable, and full performance, when desired. Further, the present invention automatically accomplishes switching between the two modes, which simplifies initiation of operation of the communications system.

In one embodiment of the present invention, a system for intercommunicating data traffic comprises a backplane having a plurality of data traffic communications connections operable to communicate data traffic, the backplane having a plurality of data rates of operation and a Service Unit having a plurality of external data traffic communications interfaces and a data traffic communications interface to the data traffic communications connections of the backplane, the Service Unit operable to communicate data between the plurality of external data traffic communications interfaces and the data traffic communications interface, the Service Unit further including a multiplexer operable to multiplex data from the plurality of external data traffic communications interfaces to the data traffic communications interface in a plurality of modes of operation.

In one aspect of the present invention, a first mode of operation of the multiplexer comprises multiplexing a portion of the data from each of at least a portion of the plurality of external data traffic communications interfaces to the data traffic communications interface, wherein the data traffic communications interface operates at a first data rate and a second mode of operation of the multiplexer comprises passing the data from each of at least a portion of the plurality of external data traffic communications interfaces to the data traffic communications interface, wherein the data traffic communications interface operates at a second data rate. When the multiplexer is in the first mode of operation, the backplane operates at the first data rate and when the multiplexer is in the second mode of operation, the backplane operates at the second data rate.

In one aspect of the present invention, the backplane operates at an STS3 data rate or an STS12 data rate, each of the plurality of external data traffic communications interfaces operates at an OC3 data rate, and the data traffic communications interface operates at an STS3 data rate or an STS12 data rate.

A first mode of operation of the multiplexer comprises multiplexing an STS1 data rate channel of data from each of at least a portion of the plurality of external data traffic communications interfaces to the data traffic communications interface, wherein the data traffic communications interface operates at an STS3 data rate. Each of the portion of the plurality of external data traffic communications interfaces carries data traffic at a data rate equal to or less than STS1.

A second mode of operation of the multiplexer comprises passing the OC3 data rate channel of data from each of at least a portion of the plurality of external data traffic communications interfaces to the data traffic communications interface, wherein the data traffic communications interface operates at an STS12 data rate. When the multiplexer is in the first mode of operation, each of the portions of the plurality of external data traffic communications interfaces may carry data traffic at a data rate equal to or less than STS1. When the multiplexer is in the second mode of operation, at least one of the portions of the plurality of external data traffic communications interfaces may carry data traffic at a data rate greater than STS1.

A third mode of operation of the multiplexer comprises passing a single OC3 data rate channel of data from a single external data traffic communications interface to the data traffic communications interface, wherein the data traffic communications interface operates at an STS3 data rate. A mode of operation of the multiplexer may be switched automatically. A mode of operation of the multiplexer may be switched manually. A mode of operation of the multiplexer may be switched manually via provisioning or using a manual override command.

A second mode of operation of the multiplexer comprises passing the OC3 data rate channel of data from each of at least a portion of the plurality of external data traffic communications interfaces to the data traffic communications interface, wherein the data traffic communications interface operates at an STS12 data rate. At least one of the portions of the plurality of external data traffic communications interfaces may carry data traffic at a data rate greater than STS1.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention provides the capability to connect external interfaces that use one third or less of the OC3 bandwidth capacity in a reduced bandwidth mode that reduces system cost, while automatically switching to the full bandwidth mode to allow connection to external interfaces that utilize the full OC3 bandwidth capacity. Thus, the present invention advantageously provides a combination of reduced cost, where applicable, and full performance, when desired. Further, the present invention automatically accomplishes switching between the two modes, which simplifies initiation of operation of the communications system.

Figure 1:
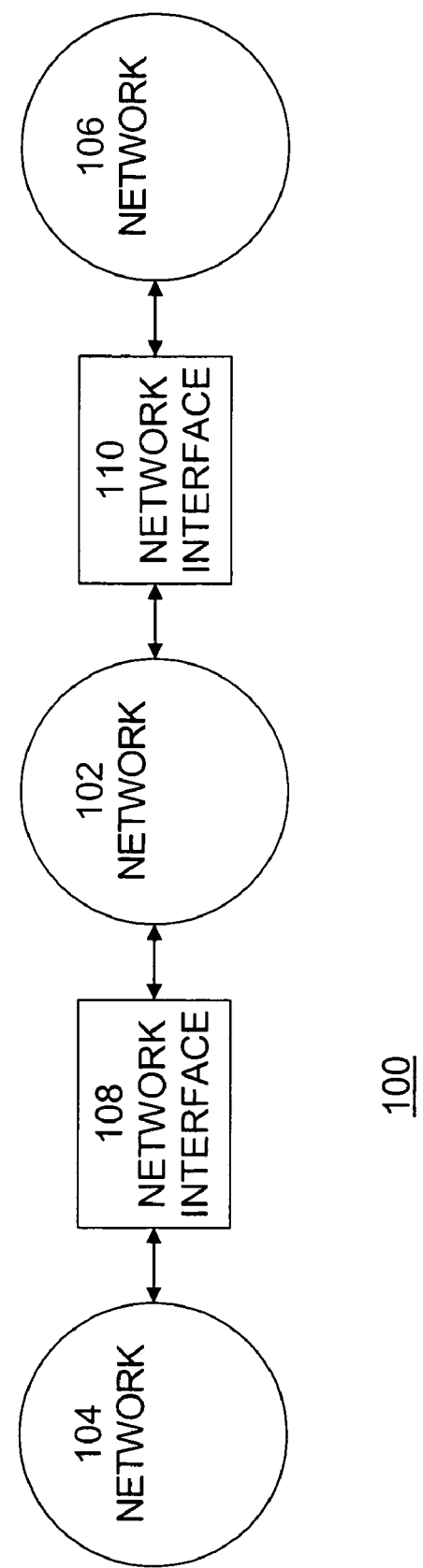
FIG. 1 is an exemplary block diagram of a system in which the present invention may be implemented.

There are a number of ways to provide service that can result in using all or part of an STS-1 of bandwidth on a physical OC3 channel. For example:
- up to a maximum of 28 VT1.5 encapsulated DS1 signals
- up to a maximum of 28 VT1.5 using LoVCAT (Low Order Virtual Concatenation) of mapped Ethernet signals
- up to 28 VT1.5 carrying BYTE SYNC format of DS0 signals
- any combination of the above—with up to 28 maximum VT1.5
- a single STS-1 encapsulated DS3 signal.
- a single STS-1 encapsulated (50% wire speed) 100BT Ethernet signal An exemplary block diagram of a system 100 in which the present invention may be implemented is shown in FIG. 1. System 100 includes a Wide Area Network 102 (WAN), one or more Local Area Networks 104 and 106 (LAN), and one or more LAN/WAN interfaces 108 and 110. A LAN, such as LANs 104 and 106, is computer network that spans a relatively small area. Most LANs connect workstations and personal computers. Each node (individual computer) in a LAN has its own CPU with which it executes programs, but it also is able to access data and devices anywhere on the LAN. This means that many users can share expensive devices, such as laser printers, as well as data. Users can also use the LAN to communicate with each other, by sending e-mail or engaging in chat sessions.

There are many different types of LANs, Ethernets being the most common for Personal Computers (PCs). Most Apple Macintosh networks are based on Apple's AppleTalk network system, which is built into Macintosh computers.

Most LANs are confined to a single building or group of buildings. However, one LAN can be connected to other LANs over any distance via longer distance transmission technologies, such as those included in WAN 102. A WAN is a computer network that spans a relatively large geographical area. Typically, a WAN includes two or more local-area networks (LANs), as shown in FIG. 1. Computers connected to a wide-area network are often connected through public networks, such as the telephone system. They can also be connected through leased lines or satellites. The largest WAN in existence is the Internet.

Among the technologies that may be used to implement WAN 102 are optical technologies, such as Synchronous Optical Network (SONET) and Synchronous Digital Hierarchy (SDH). SONET is a standard for connecting fiber-optic transmission systems. SONET was proposed by Bellcore in the middle 1980s and is now an ANSI standard. SONET defines interface standards at the physical layer of the OSI seven-layer model. The standard defines a hierarchy of interface rates that allow data streams at different rates to be multiplexed. SONET establishes Optical Carrier (OC) levels from 51.8 Mbps (about the same as a T-3 line) to 9.92 Gbps. Prior rate standards used by different countries specified rates that were not compatible for multiplexing. With the implementation of SONET, communication carriers throughout the world can interconnect their existing digital carrier and fiber optic systems.

SDH is the international equivalent of SONET and was standardized by the International Telecommunications Union (ITU). SDH is an international standard for synchronous data transmission over fiber optic cables. SDH defines a standard rate of transmission at 155.52 Mbps, which is referred to as STS-3 at the electrical level and STM-1 for SDH. STM-1 is equivalent to SONET's Optical Carrier (OC) levels-3.

In this document, a number of embodiments of the present invention are described as incorporating SONET. Although, for convenience, only SONET embodiments are explicitly described, one of skill in the art would recognize that all such embodiments may incorporate SDH and would understand how to incorporate SDH in such embodiments. Therefore, wherever SONET is used in this document, the use of either SONET or SDH is intended and the present invention is to be understood to encompass both SONET and SDH.

LAN/WAN interfaces 108 and 110 provide electrical, optical, logical, and format conversions to signals and data that are transmitted between a LAN, such as LANs 104 and 106, and WAN 102.

Figure 2:
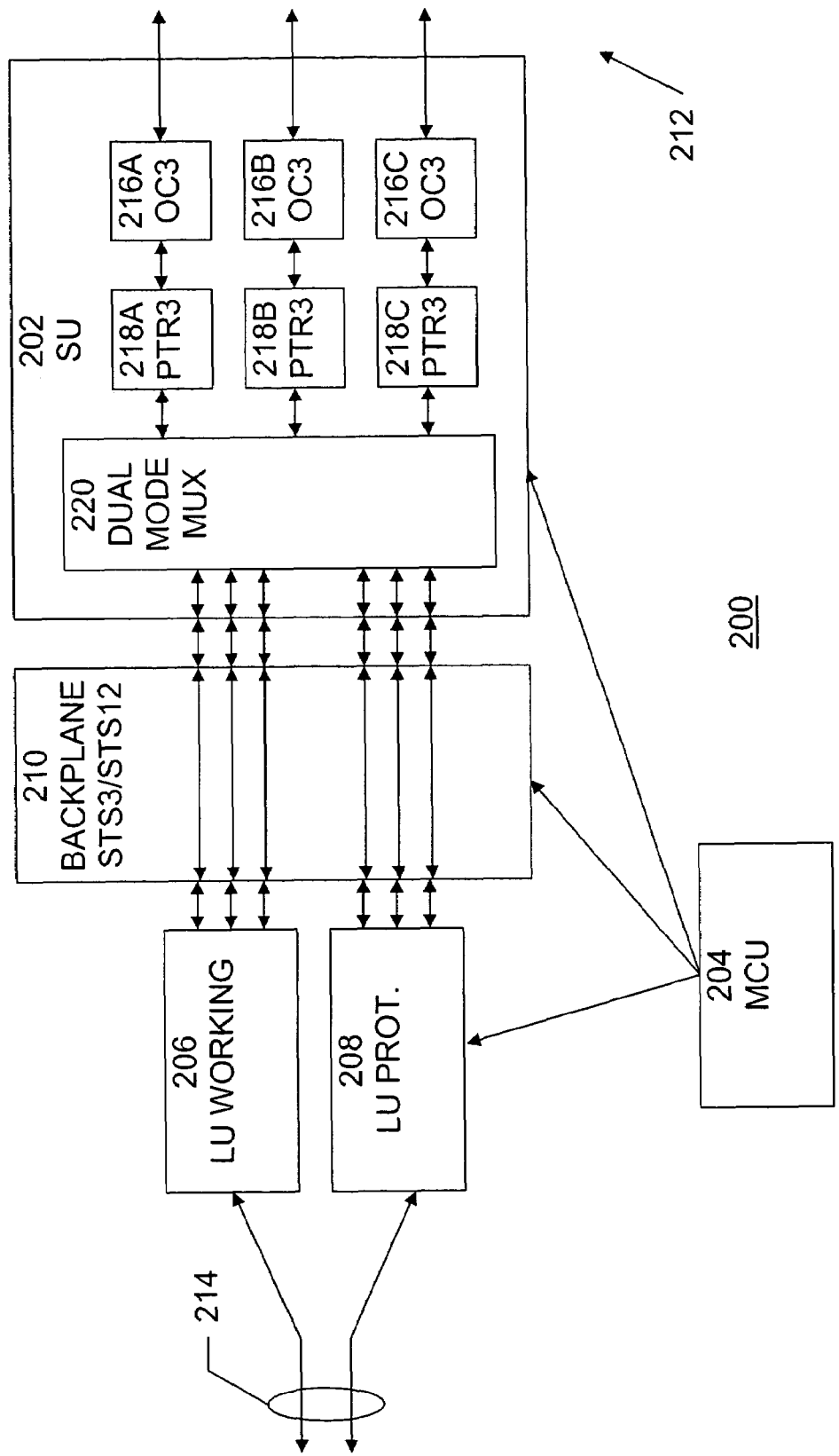
FIG. 2 is an exemplary block diagram of a system in which the present invention may be implemented.

An exemplary block diagram of a system 200 in which the present invention may be implemented is shown in FIG. 2. System 200 includes Service Unit (SU) 202, Management & Control Unit (MCU) 204, a plurality of Line Units (LUs), including LU Working 206 and LU Protection 208, and backplane 210. SU 202 provides the interface between the network connected to OC3 ports 212 and the network connected to the ports 214 of the LUs 206 and 208. Ports 212 provide an interface to external data traffic signals.

MCU 204 provides management functions to system 200, via interfacing with local craft ports, SONET Digital Control Channel (DCC), and/or others. The provided functions include, for example, downloading configuration settings, collection of SONET Performance Monitoring counts, alarms and outages, and controlling protection switching.

Backplane 210 provides the signal connectivity among the other parts of system 200 that allow the parts of the system to communicate. In particular, backplane 210 provides Management & Control connections that allow MCU to control SU 202 and LUs 206 and 208. One example of a technology that may be used to provide Management & Control connections is the Serial Hardbus.

Backplane 210 also provides data traffic communications connections SU 202 and LUs 206 and 208. Backplane 210 is a dual mode backplane that can operate at either STS3 or STS12 data rates, as controlled by MCU 204. At STS3 data rates, backplane 210 transfers data between connected units, such as LUs 206 and 208 and SU 202 at approximately 155 Mbps, while at STS12 data rates, backplane 210 transfers data between connected units at approximately 622 Mbps.

Each LU, such as LUs 208 and 210, provides timing control to access precision network clock, provides SONET frame pulse reference, and can contain optical interfaces to transmit part of all of the SONET data on the SONET network. For example, the LUs may provide OC3/12/48 SONET service to a SONET network connected to ports 214.

SU 202 includes a plurality of OC3 optical interfaces 216A-C, a plurality of PTR3s 218A-C, and a dual mode multiplexer 220. OC3 optical interfaces 216A-C receive electrical signals, adapt and convert them for transmission over optical fibers, and transmit the signals over optical fibers from ports 212. OC3 optical interfaces 216A-C operate at the OC3 data rate and configuration. Dual mode mux 220 multiplexes signals communicated between the optical interfaces and backplane 210. In particular, mux 220 can, in one mode, multiplex the signals communicated with the optical interfaces into one STS3 channel for communication over backplane 210. Likewise, mux 220 can, in the other mode, multiplex the signals communicated with the optical interfaces into one STS12 channel for communication over backplane 210. The rate at which backplane 210 operates is set by MCU 204 as appropriate.

Figure 3:
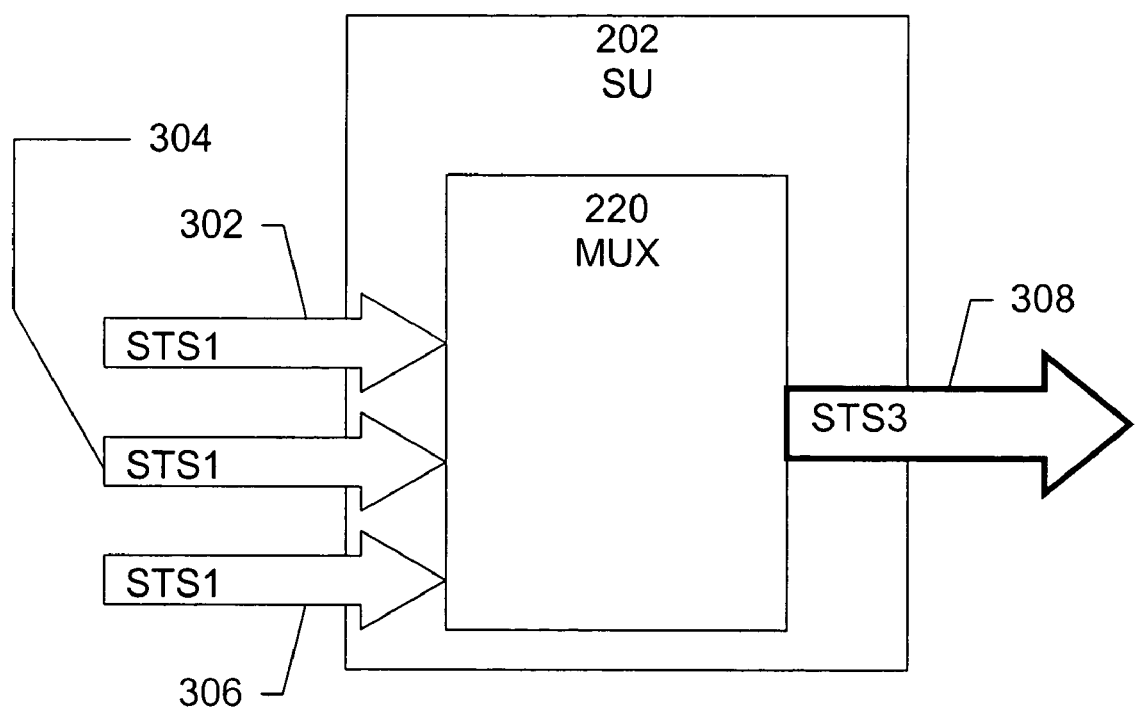
FIG. 3 is an exemplary block diagram showing one embodiment of interfaces to a Service Unit shown in FIG. 2.

For example, referring briefly to FIG. 3 in conjunction with FIG. 2, SU 202 interfaces with three OC3 signals 302, 304, and 306, and may interface with backplane 210 at either an STS3 or an STS12 rate. If each OC3 signal 302, 304, and 306 has customer traffic with a data rate low enough to be carried by an STS1 channel, then mux 220 multiplexes one STS1 channel (which is only a portion of the bandwidth of an OC3 signal) from each OC3 signal 302, 304, and 306 onto backplane 210 at the STS3 rate 308.

Figure 4:
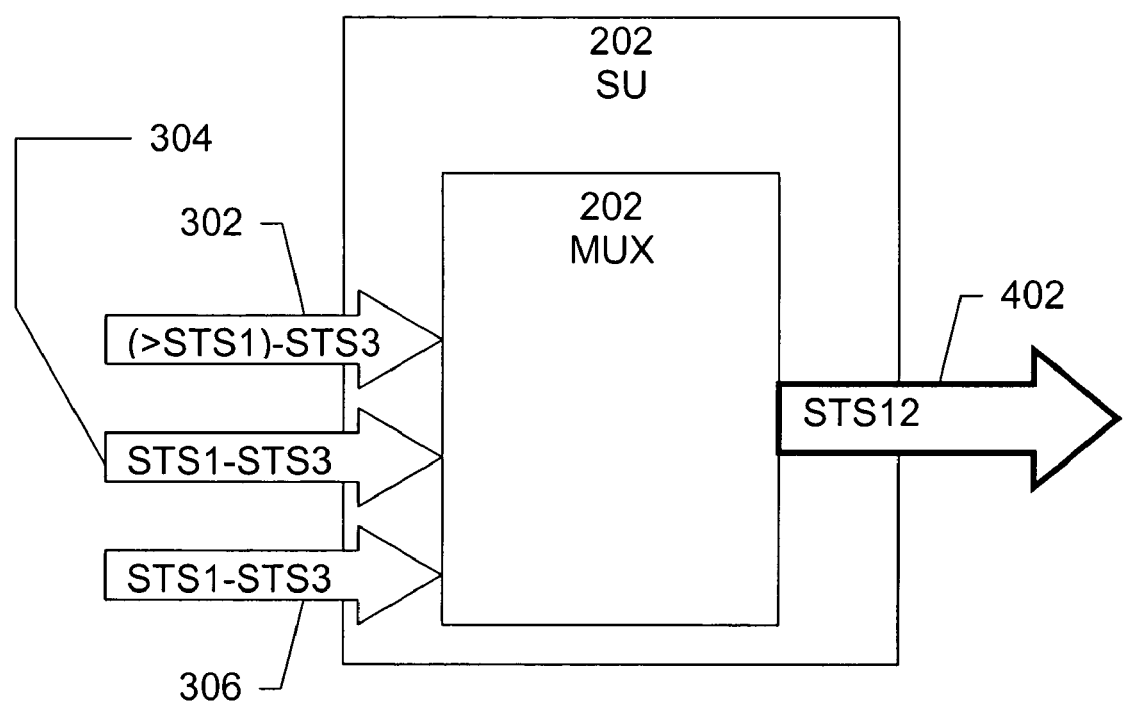
FIG. 4 is an exemplary block diagram showing one embodiment of interfaces to a Service Unit shown in FIG. 2.

Alternatively, referring briefly to FIG. 4 in conjunction with FIG. 2, if at least one OC3 signal 302, 304, or 306 has customer traffic with a data rate greater than that that can be carried by an STS1 channel, then mux 220 multiplexes the entire bandwidth of each OC3 signal 302, 304, and 306 onto backplane 210. Since the bandwidth of an OC3 signal equals the STS3 bandwidth, the resulting bandwidth is 3×STS3, which is STS 9. Thus, the resulting signal is multiplexed onto backplane 210 at the STS12 rate 402, which is the supported mode that is sufficient to handle the STS9 traffic rate.

Figure 5:
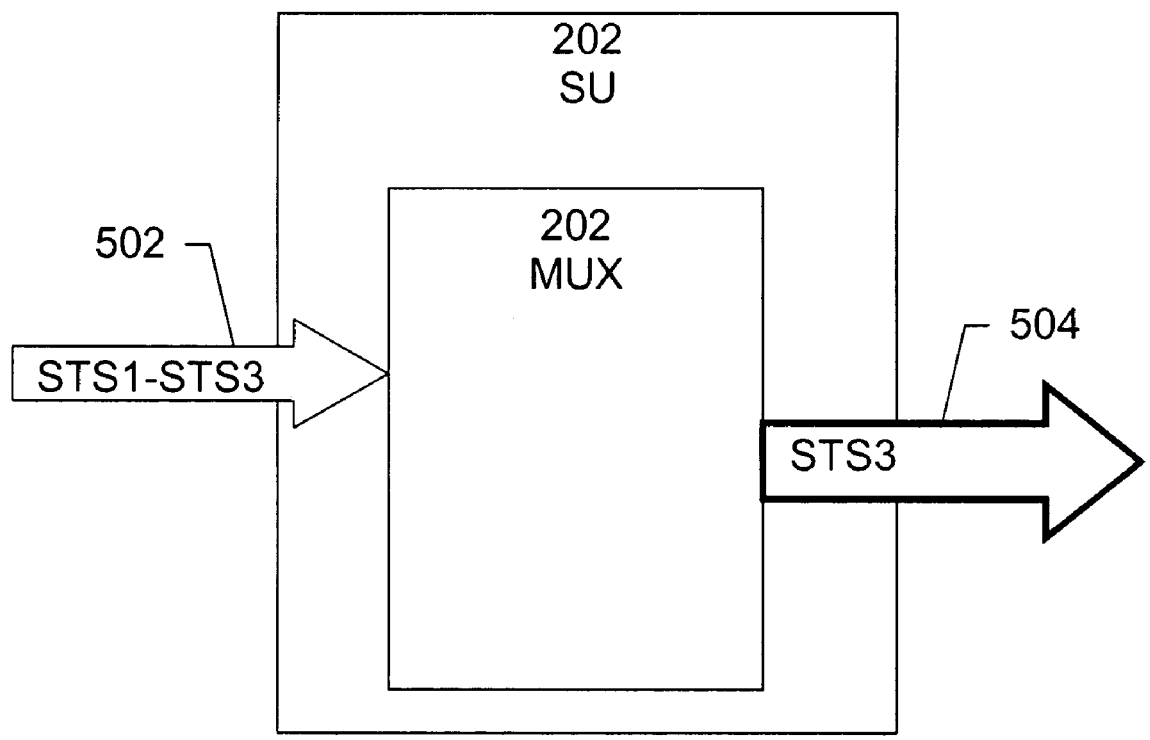
FIG. 5 is an exemplary block diagram showing one embodiment of interfaces to a Service Unit shown in FIG. 2.

As another alternative, referring briefly to FIG. 5 in conjunction with FIG. 2, a single OC3 signal 502, which may be an STS1 or STS3 channel, but typically is an STS3 channel, is fully sent to backplane at OC3 rate 504. This provides for a single full rate port, using an STS3 rate backplane.

Typically, automatic rate switching is provided. However, the rate switching may also be set manually, such as via provisioning or using a manual override command to the system. For automatic switching, MCU 204 sets the rate of backplane 210 depending upon the data rate of the LUs that are installed in system 200. In particular, LUs that operate at the STS3 rate may be installed in system 200 or LUs that operate at the STS12 rate may be installed in system 200.

The present invention provides the capability to connect external interfaces that use one third or less of the OC3 bandwidth capacity in a reduced bandwidth mode that reduces system cost, while automatically switching to the full bandwidth mode to allow connection to external interfaces that utilize the full OC3 bandwidth capacity. Thus, the present invention advantageously provides a combination of reduced cost, where applicable, and full performance, when desired. Further, the present invention automatically accomplishes switching between the two modes, which simplifies initiation of operation of the communications system.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for intercommunicating data traffic comprising:
   a backplane having a plurality of data traffic communications connections to communicate data traffic, the backplane having at least one set of data traffic communications connections adapted to operate at a plurality of data rates of operation; and
   a Service Unit having a plurality of external data traffic communications interfaces and a data traffic communications interface to the data traffic communications connections of the backplane, the Service Unit to communicate data between the plurality of external data traffic communications interfaces and the data traffic communications interface, the Service Unit further including a multiplexer to multiplex data from the plurality of external data traffic communications interfaces to the data traffic communications interface in a plurality of modes of operation.

2. The system of claim 1, wherein:
   a first mode of operation of the multiplexer comprises multiplexing a portion of the data from each of at least a portion of the plurality of external data traffic communications interfaces to the data traffic communications interface, wherein the data traffic communications interface operates at a first data rate; and
   a second mode of operation of the multiplexer comprises passing the data from each of at least a portion of the plurality of external data traffic communications interfaces to the data traffic communications interface, wherein the data traffic communications interface operates at a second data rate.

3. The system of claim 2, wherein:
   when the multiplexer is in the first mode of operation, the backplane operates at the first data rate; and
   when the multiplexer is in the second mode of operation, the backplane operates at the second data rate.

4. The system of claim 1, wherein:
   the backplane operates at an STS3 data rate or an STS12 data rate.

5. The system of claim 4, wherein:
   each of the plurality of external data traffic communications interfaces operates at an OC3 data rate.

6. The system of claim 4, wherein:
   the data traffic communications interface operates at an STS3 data rate or an STS12 data rate.

7. The system of claim 6, wherein:
a first mode of operation of the multiplexer comprises multiplexing an STS1 data rate channel of data from each of at least a portion of the plurality of external data traffic communications interfaces to the data traffic communications interface, wherein the data traffic communications interface operates at an STS3 data rate.

8. The system of claim 7, wherein:
each of the portion of the plurality of external data traffic communications interfaces carries data traffic at a data rate equal to or less than STS1.

9. The system of claim 6, wherein:
a second mode of operation of the multiplexer comprises passing the OC3 data rate channel of data from each of at least a portion of the plurality of external data traffic communications interfaces to the data traffic communications interface, wherein the data traffic communications interface operates at an STS12 data rate.

10. The system of claim 9, wherein, when the multiplexer is in the first mode of operation:
each of the portions of the plurality of external data traffic communications interfaces carries data traffic at a data rate equal to or less than STS1.

11. The system of claim 10, wherein, when the multiplexer is in the second mode of operation:
at least one of the portions of the plurality of external data traffic communications interfaces carries data traffic at a data rate greater than STS1.

12. The system of claim 11, wherein:
a third mode of operation of the multiplexer comprises passing a single OC3 data rate channel of data from a single external data traffic communications interface to the data traffic communications interface, wherein the data traffic communications interface operates at an STS3 data rate.

13. The system of claim 12, wherein:
a mode of operation of the multiplexer is switched automatically.

14. The system of claim 12, wherein:
a mode of operation of the multiplexer is switched manually.

15. The system of claim 14, wherein:
a mode of operation of the multiplexer is switched manually via provisioning or using a manual override command.

16. The system of claim 6, wherein:
a second mode of operation of the multiplexer comprises passing the OC3 data rate channel of data from each of at least a portion of the plurality of external data traffic communications interfaces to the data traffic communications interface, wherein the data traffic communications interface operates at an STS12 data rate.

17. The system of claim 16, wherein:
at least one of the portions of the plurality of external data traffic communications interfaces carries data traffic at a data rate greater than STS1.

* * * * *